INVENTOR
AKIO WATANABE

BY Stevens, Davis, Miller & Mosher

ATTORNEYS

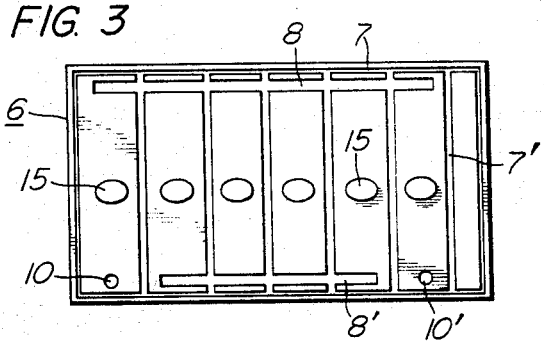
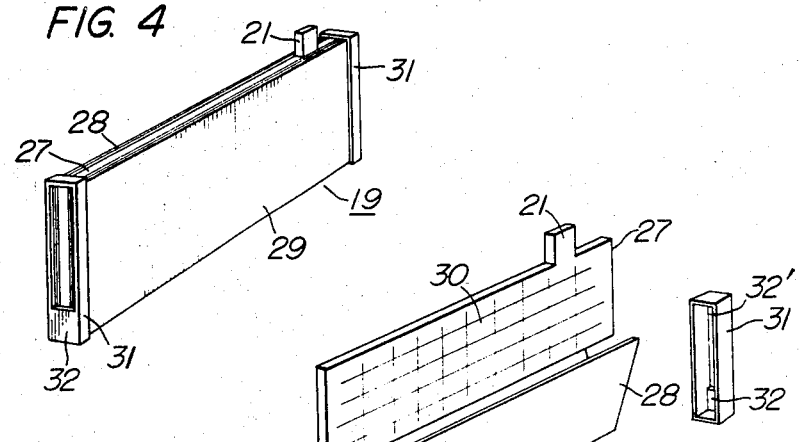
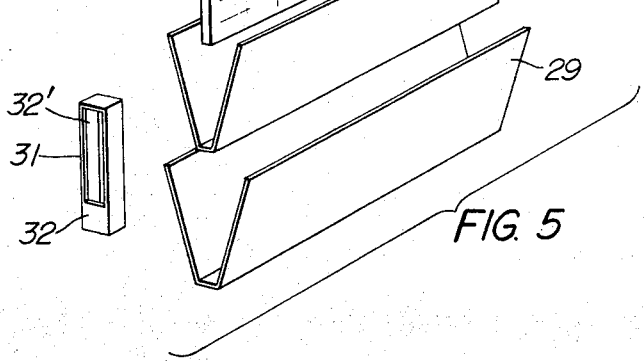

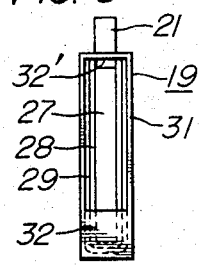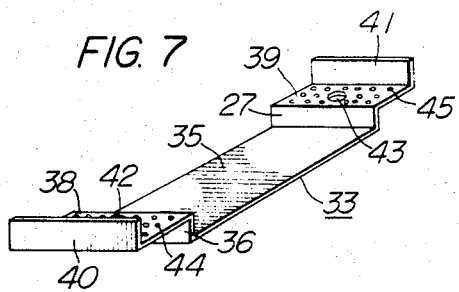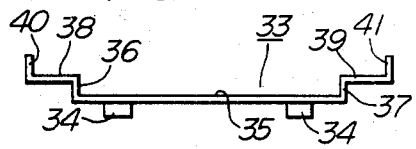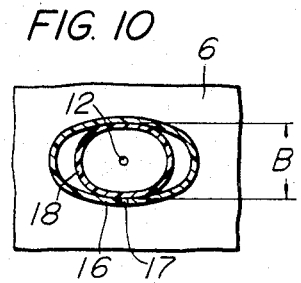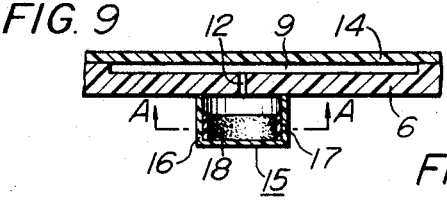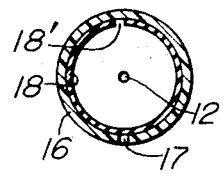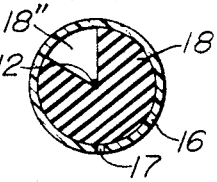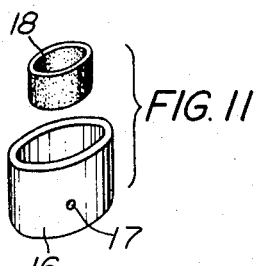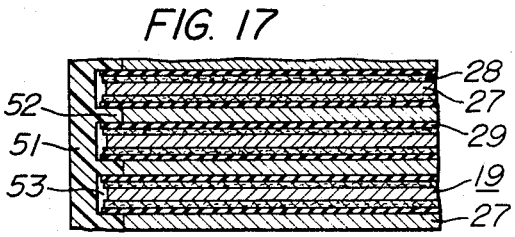

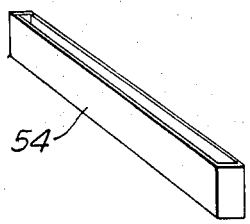
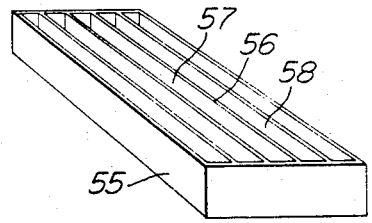
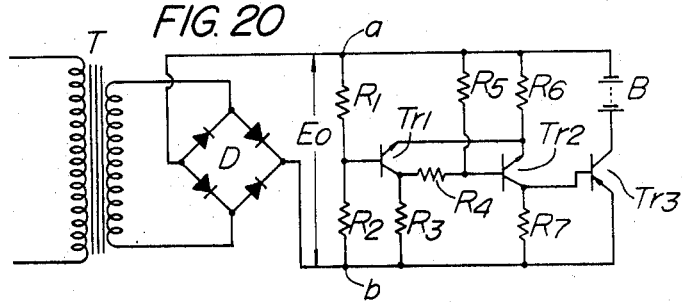
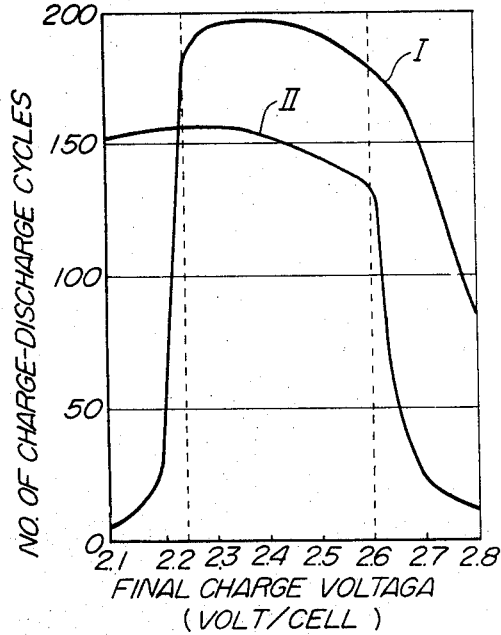
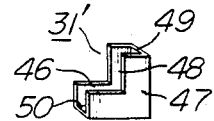
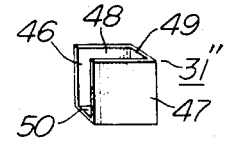
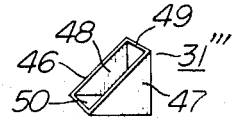

United States Patent Office 3,471,339
Patented Oct. 7, 1969

3,471,339
STORAGE BATTERY
Akio Watanabe, Chigasaki-shi, Japan, assignor to Matsusita Electric Industrial Co., Ltd., Osaka, Japan, a corporation of Japan
Filed June 19, 1967, Ser. No. 646,965
Claims priority, application Japan, June 30, 1966, 41/43,341, 41/62,924, 41/62,925; Aug. 17, 1966, 41/54,562, 41/54,563; Dec. 16, 1966, 41/115,920, 41/115,921, 41/115,922, 41/115,923; Feb. 6, 1967, 42/10,880, 42/10,881, 42/10882; Apr. 7, 1967, 42/22,547
Int. Cl. H01m 1/02, 1/08
U.S. Cl. 136—170
5 Claims

ABSTRACT OF THE DISCLOSURE

A storage battery having vent plugs mounted on the lower face of a battery cover sealingly covering the battery casing which contains power generating elements immersed in an electrolyte. The vent plug is a tubular member closed at its bottom and having a vent port which is so positioned as to be always situated above the electrolyte level even when the battery body is turned over in any direction and which is normally close by a resilient valve member.

---

This invention relates to storage batteries, and more particularly to a small-sized, portable storage battery of semihermetic sealed type which is especially suitable for use as a power source for electrical apparatus such as transistorized television receivers.

In the art of making small-sized storage batteries of semihermetic sealed type, various proposals have been made for the successful covering of electrode plates by means of glass mats and separators. The prior proposals have been such that a planar glass mat and a planar separator formed to have a slightly larger area than the surface area of the electrode plate group are disposed in a manner to lie between the positive plate and the negative plate, or one or both of the glass mat and the separator are made to a bag-like shape to cover the electrode plate. However, the former proposal, has been defective in that a lot of time is wasted in assembling the plate because the glass mat and the separator used therefor are of planar shape, and the work must be done while paying a sufficient care so as not to cause misalignment of the glass mat and the separator with respect to the electrode plate. While the latter proposal has been appreciated in the point that the work can be thereby rendered relatively easy, it has been deffective in that an additional step is required for forming the glass mat or the separator into the bag-like shape and the electrolyte can only poorly diffuse because of the fact that the electrode plate is entirely peripherally covered except the open portion of the glass mat or the separator.

The prior storage battery of the type described has been equipped with a tubular vent plug of circular cross section closed at its bottom, and the vent structure has been such that a valve member of circular annular configuration is inserted in the interior of the vent plug. However, the prior vent plug structure has been defective in that, when there is a considerable degree of variation in the diameter of the valve member, that is, when for example, the outside diameter of the valve member is larger than the inside diameter of the tubular vent plug. The valve member is difficultly inserted in the tubular vent plug and there is a fear that an increased pressure for attaining the valve opening action results in damage of the battery casing. When, on the other hand, the outside diameter of the valve member is smaller than the inside diameter of the tubular vent plug, it has been impossible to have the desired valve function because leakage develops due to presence of a clearance between the valve member and the internal face of the tubular vent plug.

It is an object of the present invention to provide a small-sized and freely portable storage battery in which effective means are provided to prevent leakage of the electrolyte and to successfully deal with vibrations imparted thereto, and more especially to provide a storage battery of semihermetic sealed type which can be used as a power source for electrical apparatus such as transistorized television receivers.

Another object of the invention is to provide a storage battery in which means are provided to remove electrolyte fumes entrained on a stream of gas such as oxygen and hydrogen produced in the battery and to exclusively discharge the gas outwardly of the battery for maintaining the battery inner pressure at a constant value to thereby improve the performance of the battery and at the same time for eliminating troubles due to discharge of the electrolyte including, for example, escape of the electrolyte and corrosion of electrical apparatus by the electrolyte.

A further object of the invention is to provide a storage battery having a long service life by virtue of the fact that shedding of the active material in the electrode, especially the active material in the positive plate due to repeated charge and discharge or due to external shock is minimized, and any internal short circuit that may result from the shedding of the active material can thereby be avoided.

Another object of the invention is to provide means for preventing any movement of or damage to the plates in the storage battery.

In accordance with the present invention, there is provided a storage battery comprising a battery casing having an upper opening and containing therein power generating elements immersed in an electrolyte, a battery cover sealingly covering the upper opening of said battery casing, a plurality of spaced tubular members having a closed bottom and mounted on the lower face of said battery cover, a vent port penetrating through the side wall of each said tubular member at such a position that said vent port is always situated above the liquid level of the electrolyte even when said battery body is turned over in any directions, and a resilient valve member normally closing said vent port.

In order that the present invention will be understood in view of the foregoing features and advantages, several embodiments thereof will now be described with reference to the accompanying drawings, in which:

FIG. 3 is a bottom plan view of an inner cover of the storage battery;

FIG. 4 is a perspective view of a plate assembly employed in the storage battery;

FIG. 5 is an exploded perspective view of the plate assembly shown in FIG. 4;

FIG. 6 is a side elevational view of the plate assembly shown in FIG. 4;

FIG. 7 is a perspective view of a protector employed in the storage battery;

FIG. 8 is a front elevational view of the protector in FIG. 7;

FIG. 9 is an enlarged vertical sectional view of a gas venting portion of the storage battery;

FIG. 10 is a section taken on the line A—A in FIG. 9;

FIG. 11 is an exploded perspective view of a vent plug in the gas venting portion shown in FIG. 9;

FIGS. 12 and 13 are cross-sectional views showing modifications of the vent plug shown in FIG. 11;

FIGS. 14, 15 and 16 are perspective views of modifications of a frame member for preventing shedding of the active material shown in FIG. 5;

FIG. 17 is a partial view of means for holding the plate assembly in place;

FIGS. 18 and 19 are perspective views showing other means for holding the plate assembly in place;

FIG. 20 is a schematic diagram of a circuit preferably used for the charging of the storage battery according to the invention; and FIG. 21 is a graph showing the relation between the final charge voltage and the number of charge-discharge cycles in the storage battery according to the invention.

Figure 1:
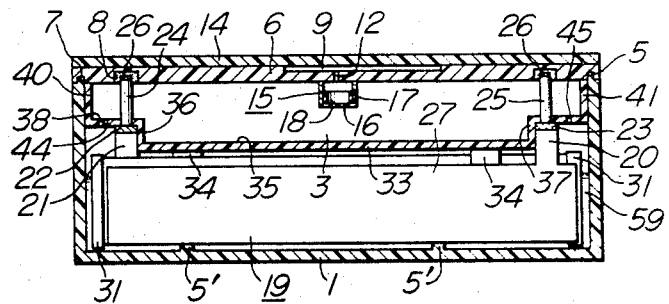
FIG. 1 is a vertical sectional view of a preferred embodiment of the storage battery according to the invention, here the battery being shown as a storage battery of semihermetic sealed type adapted for use as a power source for a seal-contained transistorized television receiver.
Figure 2:
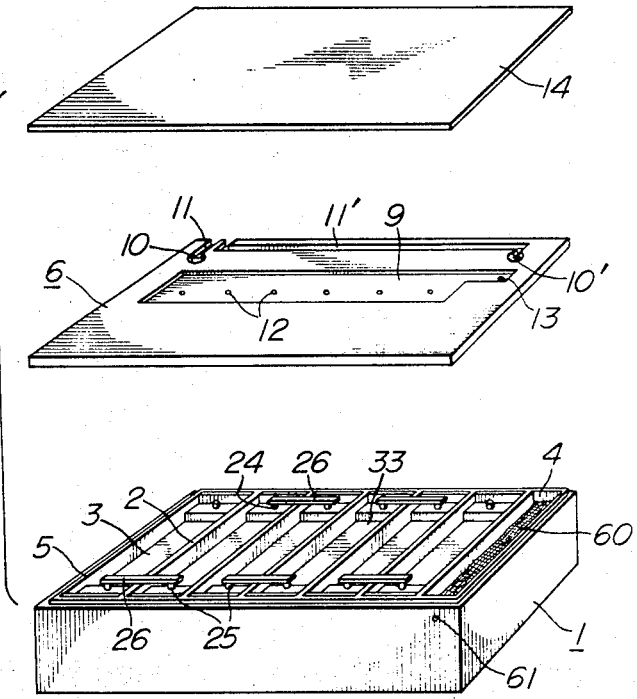
FIG. 2 is an exploded perspective view of the storage battery.

Referring to FIGS. 1 and 2, the storage battery according to the invention comprises a battery casing or container 1 of acid-resistant plastic resin or like material which is partitioned into a plurality of cells 3 and a liquid absorbing chamber 4 by means of partition walls 2. The battery casing 1 has an opening at its upper end, and a continuous ridge 5 runs on the peripheral surface of the upper end, while a plurality of ribs 5′ extend upwardly from the inner bottom face of the battery casing 1 to support electrode plates thereon. The upper opening of the battery casing 1 is sealingly covered with an inner cover 6 of acid-resistant plastic resin or like material which is provided on one face thereof with grooves 7 and 7′ to receive therein the ridge 5 and the upper ends of the partition walls 2, and grooves 8 and 8′ to receive therein connectors 26 as shown in FIG. 3. On the other face of the inner cover 6, there are provided a recess 9 which serves as a gas flow passage, lead-out ports 10 and 10′ for positive and negative terminals, and grooves 11 and 11′ joining with the respective ports 10 and 10′ for receiving therein lead wires for connecting the positive and negative terminals to a circuit outside of the storage battery. The inner cover 6 and the battery casing 1 can be sealingly secured together when an adhesive is applied to the grooves 7 and 7′ of the former and to the upper ends of the partition walls 2 and the ridge 5 of the latter, and the ridge 5 and the upper ends of the partition walls 2 are pressed into the grooves 7 and 7′. By so securing the inner cover 6 to the battery casing 1, the cells 3 and the liquid absorbing chamber 4 can be independently isolated from each other in hermetically sealed relation.

A plurality of spaced gas flow ports 12 extend downwardly from the recess 9 and through the inner cover 6 to open at positions substantially centrally of the respective cells 3. A gas flow port 13 extends downwardly through the inner cover 6 to provide communication between the liquid absorbing chamber 4 and the recess 9 which acts as the gas flow passage. A flat upper cover 14 of acid-resistant plastic resin or like material is secured to the upper face of the battery inner cover 6.

A plurality of space vent plugs 15 are mounted on the lower face of the inner cover 6 in such a manner that the central axis of each vent plug 15 is in registration with the center of the corresponding gas flow port 12. The structure of the vent plug 15 will be best understood from FIGS. 9 and 10. The vent plug 15 comprises a tubular member 16 which has a closed bottom and is made from an electrolyte-resisting synthetic resin such as acid-resistant plastic resin as in the case of the battery casing 1. The tubular member 16 is elliptical in cross section and has a small gas vent port 17 on its side wall. An annular valve member 18 of electrolyte-resisting resilient material such as rubber is received in the tubular member 16. The valve member 18 has an outside diameter slightly larger than the minor axis B of the tubular member 16 and is forcedly inserted in the tubular member 16 so that it is deformed to an elliptical shape by its resiliency as shown in FIG. 10 and resiliently engages the inner face of the tubular member 16.

With the structure as described above, the small port 17 is normally closed by the resilient engagement of the valve member 18 with the tubular member 16, and the valve member 18 is forced to partly deform to vent gas through the port 17 when the gas pressure in the battery casing 1 exceeds a predetermined setting. The function of the vent plug 15 will be described in more detail later. The tubular member 16 forming the body of the vent plug 15 is made to the elliptical cross-sectional shape in order to facilitate the molding and assembling of members including the tubular member 16 and the valve member 18. In other words, the valve member 18 of annular shape can be easily inserted in the tubular member 16 of elliptical shape by deforming the valve member 18 in the manner as shown in FIG. 10. Therefore, regardless of dimensional fluctuation in the outside diameter of the valve member 18, the valve member 18 can be satisfactorily inserted in the tubular member 16 by being deformed, and fluctuation in the valve opening pressure is quite little compared with a case in which a cylindrical member having a closed bottom is combined with an annular valve member to effect similar operation. In the invention, the valve opening pressure can be easily varied by selecting a valve member of suitable resiliency or diameter.

Further, because of the fact that the valve member 18 tends to maintain the true circular shape by its resiliency, the valve member 18 is subjected to distortion when the center of the valve member 18 is displaced from the center of the elliptical tubular member 16, and a stress imparted to the valve member 18 urges the valve member 18 to voluntarily move along the inner peripheral arcuate face of the tubular member 16 to a position at which their centers are in registration with each other. It will thus be understood that the valve member 18 is operative to normally positively close the small vent port 17 provided on the tubular member 16.

The vent plug 15 may be modified as shown in FIGS. 12 and 13, in which it will be seen that the tubular member 16 has a circular cross-sectional shape. The valve member 18 usable in these modifications may be a resilient body in the form of a short rod or a cylinder, but a considerable degree of precision is required in the outside diameter of the valve member 18 and the inside diameter of the tubular member 16. In order to relieve the above precision requirement, an axial cutout 18′ may be formed at a part of the cylindrical valve member 18 as shown in FIG. 12, or an axial cutout 18″ may be formed at a part of the short-bar valve member 18 as shown in FIG. 13. In any of the structures of the vent plug 15, the function of maintaining the gas pressure at a predetermined value can be positively attained because of the fact that the valve member 18 is deformed to effect gas venting.

A plurality of plate assemblies 19 are contained in the respective cells 3 of the battery casing 1 and rest on the ribs 5′ provided on the inner bottom face of the battery casing 1. Negative and positive plates have respective lugs 20 and 21 which are connected together by respective straps 22 and 23. Negative poles 24 and positive poles 25 protrude from the respective straps 22 and 23, and are alternately connected with each other by means of connectors 26. The connectors 26 are received in the connector receiving grooves 8 and 8′ on the battery inner cover 6, and are secured to the inner cover 6 by an adhesive filled in the grooves 8 and 8′.

The structure of the plate assembly 19 will be described in more detail. As shown in FIGS. 4 to 6, an electrode plate 27 filled with an active material is covered by means of an active material retainer 28 formed by a glass mat bent to a U-like form and a microporous separator 29 of polyvinyl chloride also bent to a U-like form. In this case, it is advantageous in view of the battery characteristics that the glass mat 28 bent to a perfect U-like form is first brought into contact with reactant surface portions 30 of the electrode plate 27 and then the separator 29 is applied to cover the glass mat 28 in order to obtain a good battery performance. Of course, the glass mat 28 and the separator 29 can be used for each of the positive and negative plates, but they should be used at least for the positive plate from which the active material is more liable to shedding.

The inventive covering structure for the electrode plate 27 can be easily made because the work to form the structure merely involves simple bending of the glass mat 28 and the separator 29 to the U-form. Further, the inventive covering structure for the electrode plate 29 permits very satisfactory diffusion of the electrolyte since the electrolyte can diffuse in three directions toward the plate 27, that is, from the opposite left-hand and right-hand sides of the electrode plate 27 and from the top portion of the electrode plate 27. The glass mat 28 and the separator 29 covering the electrode plate 27 may both be bent to the U-like form as described above, or alternatively, the separator 29 may solely be bent to the U-like form and the glass mat 28 may be provided in the form of a flat plate. Although polyvinyl chloride has been referred to as the material for forming the separator 29, the separator 29 may be formed from a microporous film of electrolyte-resisting synthetic resin or may be formed by bonding reinforced fibers of electrolyte resisting nature by polyvinyl chloride.

Frame members 31 are fitted on opposite ends of the plate assembly 19 to prevent shedding of the active material and are made from an electrolyte-resisting synthetic resin such as polyvinyl chloride. Each frame member 31 has a U-shaped portion 32 at its lower end to cover part of the lower portion of the electrode plate 27 and has a window 32' at its upper portion to expose that end portion of the electrode plate 27 to the outside therethrough. The U-shaped portion 32 at the lower end of the frame member 31 is operative to prevent the shedding of the active material in the electrode plate 27, and thus the active material retaining ability can be varied by varying the height and width of this U-shaped portion 32. When therefore the frame member 31 is designed to a suitable size, it has a sufficient ability for retaining the active material so that the height of the ribs 5', if provided to support the electrode plates 27, may be made lower, and any short circuit between the electrode plates 27 can be positively avoided even with the absence of such ribs 5'. Further, the frame members 31 serve to positively hold the glass mat 28 and the separator 29 in proper relation with respect to the electrode plate 27.

The above description has referred to fitting of the frame members 31 on the opposite ends of the plate assembly 19, but a frame member having a space between its opposite side walls may be fitted on each lower corner portion of the plate assembly 19, that is, the portion on which the U-shaped portion 32 is fitted in FIG. 6. For example, a frame member 31' shown in FIG. 14 has L-shaped opposite side walls 46 and 47, a rear wall 49 and a bottom wall 50 to define therebetween a space 48 opening forwardly and upwardly so that the lower corner portion of the plate assembly 19 can be received in the space 48. A frame member 31" shown in FIG. 15 has square-shaped opposite side walls 46 and 47, a rear wall 49 and a bottom wall 50, while a frame member 31''' shown in FIG. 16 has a triangular opposite side walls 46 and 47, a rear wall 49 and a bottom wall 50.

By employment of the frame member of the structure as described above, the ability for holding the active material can be improved, the height of the ribs 5', if provided to support the electrode plates 27, may be made lower, and any short circuit between the electrode plates 27 can be positively avoided even with the absence of such ribs 5'.

In lieu of the provision of the frame member as described above, means as shown in FIG. 17 may be employed. In FIG. 17 it will be seen that a plurality of plate retaining rims 52 are formed on opposite side walls 51 of each cell 3, and the opposite ends of the plate assembly 19 are firmly received in spaces 53 between the adjacent rims 52. With such an arrangement, the opposite ends and the bottom portion of the electrode plate 27 are sealed by the side walls 51 and the glass mat 28, and the falling fraction of the active material accumulates in the space 53 and would not drop into the battery casing 1.

Further, the glass mat 28 and the separator 29 need not necessarily be formed into the U-like shape, but a glass mat and a separator both of planar shape may be used to cover the plate assembly. In this latter case, a cap must be fitted on the bottom edge of the plate assembly so that the cap receives the falling active material therein for thereby preventing occurrence of internal short circuit. For example, a cap 54 of plastic material as shown in FIG. 18 may be fitted on the lower edge of the electrode plate whose side faces are covered by the separator layer. Alternatively, as shown in FIG. 19, a cap 55 of plastic material having partitions 56 for isolating the positive and negative electrodes from each other may be fitted on the lower end of the plate assembly so that the negative electrodes portions and positive electrode portions can be dispersed in respective compartments 57 and 58.

A protector 33 is disposed in each cell 3 in order to prevent splashing of the electrolyte and shaky movement of the plate assembly 19. As shown in FIGS. 1, 7 and 8, the protector 33 comprises a central flat plate portion 35 having adjacent to oppjosite ends thereof a plurality of projections 34 abutting the upper face of the plate assembly 19 to prevent vertical movement of the latter, a pair of upstanding portions 36 and 37 extending from the opposite ends of the portion 35 and abutting with their outer faces with the inner end faces of the straps 22 and 23, a pair of horizontal portions 38 and 39 extending outwardly from the respective portions 36 and 37 for supporting the poles, and a pair of upstanding portions 40 and 41 extending from the respective portions 38 and 39 and having their outer end faces abutted by the inner walls of the battery casing 1 and their top faces abutted by the bottom face of the battery inner cover 6. The horizontal portions 38 and 39 for supporting the poles are provided with holes 42 and 43 for receiving therein the respective poles 24 and 25 of the plate assembly 19 and are also provided with a multiplicity of small perforations 44 and 45 for ensuring smooth gas flow. However, the provision of the small perforations 44 and 45 is in no way an indispensable requirement, and the holes 42 and 43 may be cutouts provided on the side edges of the horizontal portions 38 and 39 instead of being disposed centrally of the portions 38 and 39.

The amount of the electrolyte 59 and the battery dimensions are so determined that the electrode plates can be sufficiently submerged in the electrolyte when the electrolyte is filled up to the normal level in the battery, and the electrolyte can not reach the gas vent ports 17 of the tubular members 16 mounted on the battery inner cover 6 even when the battery casing 1 is laid in any position as when the battery casing 1 is turned over or turned upside down. Of course, the gas flow ports 12 are prevented from directly contacting the electrolyte 59 by the action of the valve members 18 received in the vent plugs 15.

A mat 60 of liquid absorbing material such as a glass fiber mat is packed in the liquid absorbing chamber 4, and a gas discharge port 61 is bored through the battery casing 1 to provide means for communication between the liquid absorbing chamber 4 and the atmosphere.

The operation of the storage battery according to the invention having the structure as described above will be described in detail.

In the first place, gas generated in case of charging, especially in the event of overcharging can be reasonably vented by the action of the vent plugs 15 which are urged to open when the internal pressure of the battery casing 1 is raised beyond a certain predetermined limit due to the generation of gas. More precisely, referring to FIGS. 1 and 10, when the internal pressure of the battery casing 1 is raised beyond the predetermined limit by the gas generation the valve member 18 having closed the small gas vent port 17 by resiliently engaging the inner face of the tubular member 16 of the vent plug 15 is partly deformed by the gas pressure to establish a gas passage between the valve member 18 and the inner face of the tubular member 16. The gas in the battery casing 1 therefore is admitted into the vent plugs 15 through the vent ports 17, and then flows through the gas flow ports 12 of the battery inner cover 6 into the recess 9 serving as the gas flow passage. The gas collected into the gas flow passage 9 from the void space in the battery casing 1 in this manner is then admitted into the liquid absorbing chamber 4 through the gas flow port 13. In this case, an acid fume of the electrolyte that may be entrained on the gas stream can be absorbed by the liquid absorbing mat 60 during passage therethrough, and thus the gas can be solely discharged outwardly through the gas discharge port 61. Therefore, any acid fume of the electrolyte entrained on the gas stream can not escape outwardly by being effectively arrested by the mat 60, and electrical apparatus containing the storage battery therein can be positively protected from being damaged by the electrolyte. Even if the gas discharged through the gas discharge port 61 might catch fire, the fire can reach the interior of the battery casing 1 because the gas flow path between the gas discharge port 61 and the gas vent ports 17 is very long, and the battery casing 1 can thus be prevented from being damaged.

As will be understood from the above description, the gas generated in the battery casing 1 is led into the liquid absorbing chamber 4, wherein fog-like splashes of the electrolyte contained in the gas are condensed and removed by the mat 60 while the gas passes through the mat 60 made from material such as glass fibers having a large specific surface area. Thus, the gas discharged from the gas discharge port 61 consists solely of hydrogen or oxygen.

A material whose property is opposite to that of the electrolyte may be added to the mat 60 which functions to remove the electrolyte. For example, an alkaline material may be added as a neutralizer to the mat 60 when the electrolyte is acidic such as dilute sulfuric acid, or an acidic material may be added as a neutralizer to the mat 60 when the electrolyte is alkaline such as a caustic alkali. The use of such neutralizer is preferable since handling of the battery in the overhauling and cleaning after the elongated use can be made very easy and free from any danger in view of the fact that the electrolyte in the mat 60 has already been neutralized.

Alternatively, the mat 60 may be packed in the gas flow recess 9. Further, explosion-proof means or the like may be provided on the gas discharge port 61 so as to satisfactorily eliminate leakage of the electrolyte or discharge of the electrolyte in a mist form, and to thereby ensure safe use of electrical apparatus in domestic applications without any fear of corrosion. Moreover, there is utterly no fear of electrolyte leakage as described previously because the liquid level of the electrolyte 59 can never reach the gas flow ports 12 in the battery inner cover 6 even if the battery casing 1 might be turned upside down or operated in whatever states or if the vent plugs 15 are in their open position for the gas venting. Since further the small vent ports 17 are normally closed by the valve members 18, no electrolyte leakage takes place even when the battery casing 1 is turned upside down and vibration is imparted thereto to wet the vent ports 17 with electrolyte splashes.

The elliptical cross-sectional shape of the tubular member 16 in the vent plug 15 is advantageous in that the valve member 18 can be deformed and inserted into the tubular member 16 regardless of appreciable fluctuation in the outside diameter of the valve member 18 and can positively close with its outer face the small gas vent port 17 of the tubular member 16. The above vent plug structure can completely eliminate prior defects described previously and can sufficiently accomplish the desired function.

It will be appreciated that the provision of the frame members 31 mounted on oposite ends of the electrode plate 27 is advantageous in that shedding of the active material in the electrode plate 27, hence short circuit between adjacent electrode plates can be prevented, and the frame members 31 can securely hold the glass mat 28 and the separator 29 in proper position on the opposite sides of the electrode plate 27.

The notable effects of the protector 33 mounted on the plate assembly 19 include prevention of splashing of the electrolyte 59, freedom from shaky movement of the plate assembly 19, and prevention of short cricuit or other trouble before it occurs. More precisely, a vertical shock imparted to the battery can be effectively dealt with by the projections 34 projecting from the central flat plate portion 35 of the protector 33, which projections 34 firmly abut the upper face of the plate assembly 19 to prevent vertical movement of the plate assembly 19 in cooperation with the upstanding portions 40 and 41 abutting by their top ends with the bottom face of the battery inner cover 6. Since further the protector 33 is so constructed that the upstanding portions 40 and 41 abutting the inner walls of the battery casing 1 locks the protector 33 against lateral movement due to a lateral shock, the lateral movement of the plate assembly 19 can be prevented by the upstanding portions 36 and 37 abutting the inner faces of the straps 22 and 23 even though a lateral shock may be imparted to the battery.

It will be appreciated that the protector 33 prevents movement of the plate assembly 19 due to shocks of any directions imparted to the battery, and thus there is utterly no fear of slipping down of the glass mat 28 and the separator 29 away from the electrode plate 27, short circuiting between the plates 27, or occurrence of injury in the electrode plate 27 itself due to the shocks of the nature described above. In case the gas is generated in the battery casing 1 as described previously, the gas usually passes through the gap between the partition walls 2 and the opposite sides of the protector 33 to reach each vent plug 15. In order to ensure smooth flow of the gas, many perforations 44 and 45 are provided on the pole-supporting horizontal portions 38 and 39 of the protector 33.

In charging the above storage battery which is of semi-hermetic sealed type, it is necessary to minimize decrease o fthe electrolyte and generation of gas due to electrolysis of water. During charging of a storage battery while applying a potential which is higher than the gas generation potential, no gas generation is observed in the initial stage of the charging. It seems therefore that there exists a period of excitation between the moment of charging voltage application and the moment of gas generation. The inventors found that gas generation can be extremely suppressed and battery charging can be effected with a high efficiency under substantial freedom from occurrence of electrolysis by the injected electrical power, in case such a charging cycle is employed on the basis of the above principle that the continuous charging is switched over to pulse charging as soon as the battery voltage reaches the gas generation potential and the pulse is switched off before gas generation takes place, that is, within the period of excitation of gas generation. The period of excitation of gas generation referred to above is approximately less than 0.1 second although it has been only qualitatively determined. The period of excitation is variable depending on the type of the storage battery, property of the electrode plate or difference in the hydrogen and oxygen overvoltage, and the shape, voltage, width and period of the applied pulse. The "switch-on" period of the pulse need be shorter than the period of excitation, and the "switch-off" period may preferably be determined from the interrelation between the charging period and the battery capacity and set at such a period which can shorten the charging period to the greatest degree.

A method of charging preferably used for the storage battery of the invention will be described with reference to a materialized circuit diagram shown in FIG. 20. In FIG. 20, it will be seen that a secondary winding of a transformer T is connected across a rectifying circuit D consisting of bridge connection of diodes. Resistors $R_1$ and $R_2$ are connected in series across output terminals $a$ and $b$ of the diode rectifier circuit D, and D.C. voltage $E_o$ derived therefrom is applied to input terminals of a jumping circuit formed by two NPN transistors $Tr_1$ and $Tr_2$ with their emitters connected in common, and five resistors $R_3$, $R_4$, $R_5$, $R_6$ and $R_7$. The base of the preceding transistor $Tr_1$ in this jumping circuit is connected to an intermediate point $c$ between the series resistors $R_1$ and $R_2$. This intermediate point $c$ is used as a voltage detecting point. To the output terminal of the succeeding transistor $Tr_2$ in the jumping circuit, there is connected the base of a PNP transistor $Tr_3$ forming a current amplifier. A storage battery B to be charged is connected to the output terminal of the transistor $Tr_3$.

The principle of operation of the above jumping circuit will next be described. Suppose now that the transistor $Tr_1$ has a base voltage $E_b$, emitter voltage $E_e$ and operating voltage $V_{be}$. Then, the transistor $Tr_1$ is turned "on" and the transistors $Tr_2$ and $Tr_3$ turned "off" in case there is a relation $$E_b - E_e > V_{be} \tag{1}$$

while the transistor $Tr_1$ is turned "off" and the transistors $Tr_2$ and $Tr_3$ turned "on" in case the above relation is reversed, that is, $$E_b - E_e < V_{be} \tag{2}$$

The values of the resistors $R_1$ and $R_2$ are so determined that the above relation (1) is satisfied when the charged voltage of the storage battery B reaches a final charge voltage so that the transistor $Tr_1$ is urged to its conducting state and the transistors $Tr_2$ and $Tr_3$ to their cut-off state for thereby preventing overcharge of the storage battery B. At the same time, the hysteresis effect of the jumping circuit, that is, the relation $E_{on} < E_{off}$ of the operating voltage of the jumping circuit is utilized to effect pulse-like supplementary charging after the completion of charge for thereby improving the charging effect.

The above operation will be described in more detail hereunder. During a period after initiation of charging and before the battery voltage reaches the final charge voltage, the transistor $Tr_1$ is in its cutoff state and the transistors $Tr_2$ and $Tr_3$ are in their conducting state so that a substantially uniform and large current flows through the storage battery B. However, as soon as the final charge voltage is reached, the transistor $Tr_1$ is urged to its conducting state and the transistors $Tr_2$ and $Tr_3$ to their cutoff state to cut off the charging current. Under this situation, any further charging is impossible. Since, however, the battery voltage gradually decreases after the charging current has been cut off, the jumping circuit is again actuated to start charging the storage battery B after a predetermined time at which the relation $$E_{on} < E_{off}$$

is brought forth by the hysteresis effect of the jumping circuit.

In another predetermined time after the initiation of the second charging, the battery voltage is again raised to urge the transistor $Tr_1$ to its conducting state and the transistors $Tr_2$ and $Tr_3$ to their cutoff state so that the charging current is again cut off. In another predetermined time after the cutoff of the charging current, the battery voltage again decreases to the $E_{on}$ voltage in the relation $E_{on} < E_{off}$, and the operation of the jumping circuit for the predetermined time effects charging of the storage battery. In this manner, the jumping circuit is repeatedly actuated in response to decrease in the battery voltage after the completion of first charging for thereby repeating the supplementary charging.

It will be understood that overcharge of the storage battery B can be avoided by applying the voltage in the pulse-like manner as described above. The inventors made an experiment to find the interrelation between the number of charge-discharge cycles and the final charge voltage relative to the charging period and found that there is an important factor therebetween as shown in FIG. 21. The curve I in FIG. 21 represents the relation between the final charge voltage and the life cycle when the storage battery is subjected to repeated charge-discharge cycles in each of which the storage battery is charged for 10 hours and is discharged to a value of 1.75 volts per cell at a 5 hour rate. From the curve I, it will be seen that a final charge voltage of less than 2.25 volts per cell results in insufficient charging and the battery service life is extremely lowered. In this case, a final charge voltage of 2.4 volts per cell is most preferred in respect of the service life, and a final charge voltage higher than the above value results in shortening of the service life. This shortening of the service life, however, is not so marked as that with the final charge voltage of less than 2.25 volts per cell. The curve II in FIG. 21 represents the similar relation when the storage battery is subjected to repeated charge-discharge cycles in each of which the storage battery is charged for 150 hours and is discharged to a value of 1.75 volts per cell at a 5 hour rate. From the curve II, it will be seen that a conspicuous shortening of the service life occurs at a final charge voltage of more than 2.6 volts per cell. In order, therefore, to improve the charging efficiency, to eliminate loss of electrolyte due to gas generation and to avoid extreme shortening of the battery service life even with charging for an extended period of time, it is desirable to set the final charge pulse voltage within a range of 2.25 to 2.60 volts per cell in view of the interrelation between the charging period and the battery service life and to charge the battery in an intermittent and pulsating fashion.

What is claimed is:

1. A storage battery comprising a battery casing having an upper opening and containing therein power generating elements immersed in an electrolyte, a battery cover sealingly covering the upper opening of said battery casing, a plurality of spaced tubular members having a closed bottom and mounted on the lower face of said battery cover, a vent port penetrating through the side wall of each said tubular member at such a position that said vent port is always situated above the liquid level of the electrolyte even when said battery body is turned over in any direction, and a resilient member disposed in said tubular member normally closing said vent port.

2. A storage battery comprising a battery casing having an upper opening and containing therein power generating elements immersed in an electrolyte, a battery cover sealingly covering the upper opening of said battery casing, a gas vent passage formed on the upper face of said battery cover and communicating with the atmosphere through electrolyte removing means, a plurality of spaced gas flow ports extending through said battery cover to communicate with said gas vent passage, a plurality of spaced tubular members having a closed bottom and mounted on the lower face of said battery cover in a manner that said tubular members communicate with said gas flow ports at their upper openings, a vent port penetrating through the lower portion of each said tubular member at such a position that said vent port is always situated above the liquid level of the electrolyte even when said battery body is turned over in any direction, and a resilient valve member disposed in said tubular member to normally close said vent port.

3. A storage battery comprising a battery casing having an upper opening and containing therein a plurality of plate assemblies immersed in an electrolyte, each of said plate assembly including the combination of at least one electrode plate of one polarity and at least one electrode plate of opposite polarity electrically isolated from each other by means of a separator which engages opposite surfaces of said first electrode plate and which has its lower edge and lower corner portions covered by suitable means, a battery cover sealingly covering the upper opening of said battery casing, a plurality of spaced tubular members having a closed bottom and mounted on the lower face of said battery cover, a vent port penetrating through the side wall of each said tubular member at such a position that said vent port is always situated above the liquid level of the electrolyte even when said battery body is turned over in any direction, and a resilient member disposed in said tubular member normally closing said vent port.

4. A storage battery comprising a battery casing having an upper opening and containing therein a plurality of plate assemblies immersed in an electrolyte, each of said plate assembly being secured in position by means of a protector having a flat plate portion abutting the upper end of said plate assembly, a pair of upstanding portions forming integral extensions from the opposite ends of said flat plate portion and abutting the straps on said plate assembly, a pair of horizontal portions extending from the opposite ends of said upstanding portions for supporting the poles of said plate assembly, and a pair of upstanding portions forming integral extensions from the opposite ends of said horizontal portions and abutting the inner walls of said battery casing, a battery cover sealingly covering the upper opening of said battery casing, a plurality of spaced tubular members having a closed bottom and mounted on the lower face of said battery cover, a vent port penetrating through the side wall of each said tubular member at such a position that said vent port is always situated above the liquid level of the electrolyte even when said battery body is turned over in any direction, and a resilient member disposed in said tubular member normally closing said vent port.

5. A storage battery comprising a battery casing having an upper opening and containing therein a plurality of plate assemblies immersed in an electrolyte, each of said plate assembly being secured in position by means of a protector having a flat plate portion abutting the upper end of said plate assembly, a pair of upstanding portions forming integral extensions from the opposite ends of said flat plate portion and abutting the straps on said plate assembly, a pair of horizontal portions extending from the opposite ends of said upstanding portions for supporting the poles of said plate assembly, and a pair of upstanding portions forming integral extensions from the opposite ends of said horizontal portions and abutting the inner walls of said battery casing, a battery cover sealingly covering the upper opening of said battery casing, a plurality of spaced gas flow ports extending through said battery cover to communicate with the atmosphere through electrolyte removing means, a plurality of spaced tubular members of elliptical cross section having a closed bottom and mounted on the lower face of said battery cover in a manner that said tubular members communicate with said gas flow ports at their upper openings, a vent port penetrating through the lower portion of each of said tubular member at such a position that said vent port is always situated above the liquid level of the electrolyte even when said battery body is turned over in any direction, and a resilient valve member disposed in said tubular member to normally close said vent port.

References Cited
UNITED STATES PATENTS

| 2,099,599 | 11/1937 | De Lange | 136—179 |
| 2,117,792 | 5/1938 | De Lange | 136—179.1 |
| 2,136,568 | 11/1938 | Sziklai | 136—178.1 |
| 2,201,510 | 5/1940 | Waner | 136—178.8 |

WINSTON A. DOUGLAS, Primary Examiner

D. L. WALTON, Assistant Examiner

U.S. Cl. X.R.

136—79, 81, 178